United States Patent [19]

Wong

[11] Patent Number: 4,524,907

[45] Date of Patent: Jun. 25, 1985

[54] AUTOMOTIVE THERMOSTATIC FLUID CONTROL VALVE DEVICE

[75] Inventor: Backman Wong, Wayland, Mass.

[73] Assignee: Standard-Thomson Corporation, Waltham, Mass.

[21] Appl. No.: 635,540

[22] Filed: Jul. 30, 1984

Related U.S. Application Data

[63] Continuation of Ser. No. 513,803, Jul. 14, 1983, abandoned, which is a continuation of Ser. No. 318,321, Nov. 5, 1981, abandoned.

[51] Int. Cl.³ ............................................ G05D 23/12
[52] U.S. Cl. .................................... 236/34.5; 236/100
[58] Field of Search ...................... 236/34, 34.5, 100; 29/513

[56] References Cited

U.S. PATENT DOCUMENTS 3,310,871  3/1967  Humiston ........................ 29/513 X
4,245,960  1/1981  Matthews ........................ 29/513 X
4,248,374  2/1981  Sliger ................................ 236/34.5

Primary Examiner—William E. Tapolcai
Attorney, Agent, or Firm—Jacox & Meckstroth

[57] ABSTRACT

A thermally responsive fluid control valve device which is particularly adapted to be mounted in the coolant system of an automotive type engine. The thermally responsive fluid control valve device includes a frame member which consists of two sheet metal members attached together. One of the sheet metal members comprises a single-piece sheet metal member which includes a plurality of leg portions and a plurality of foot portions connected by a single ring portion, all of the portions being integral. The foot portions are adapted to engage a surface within the coolant system. The frame member also has another engagement surface, which with the foot portions, position the fluid control valve device within the coolant system.

4 Claims, 4 Drawing Figures

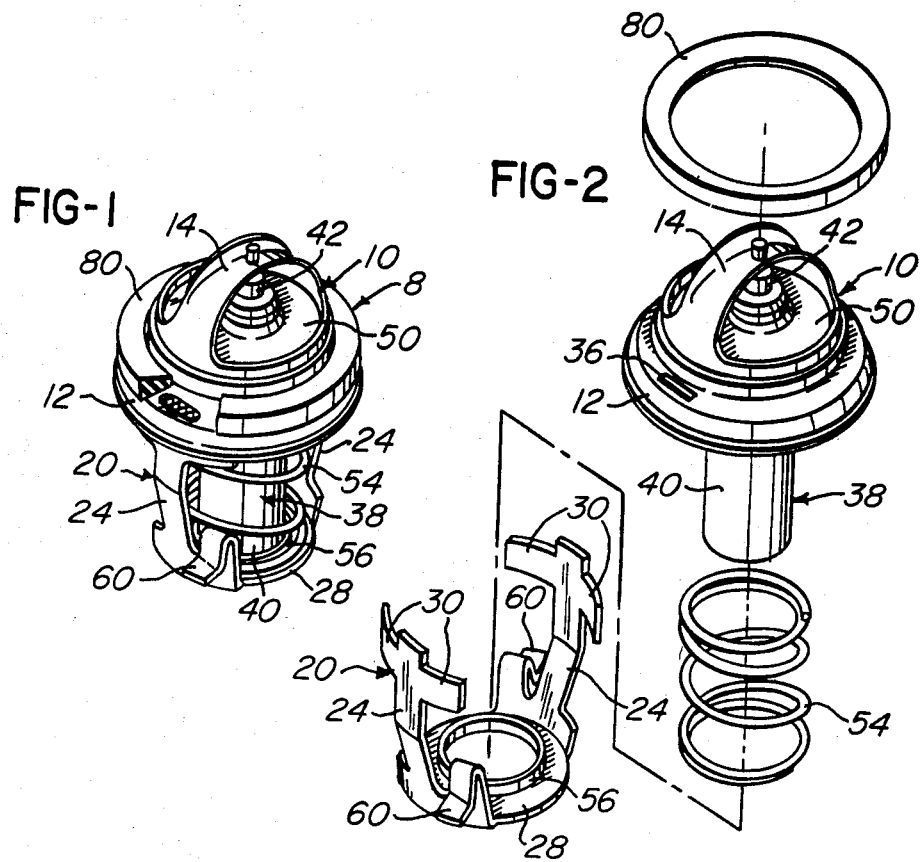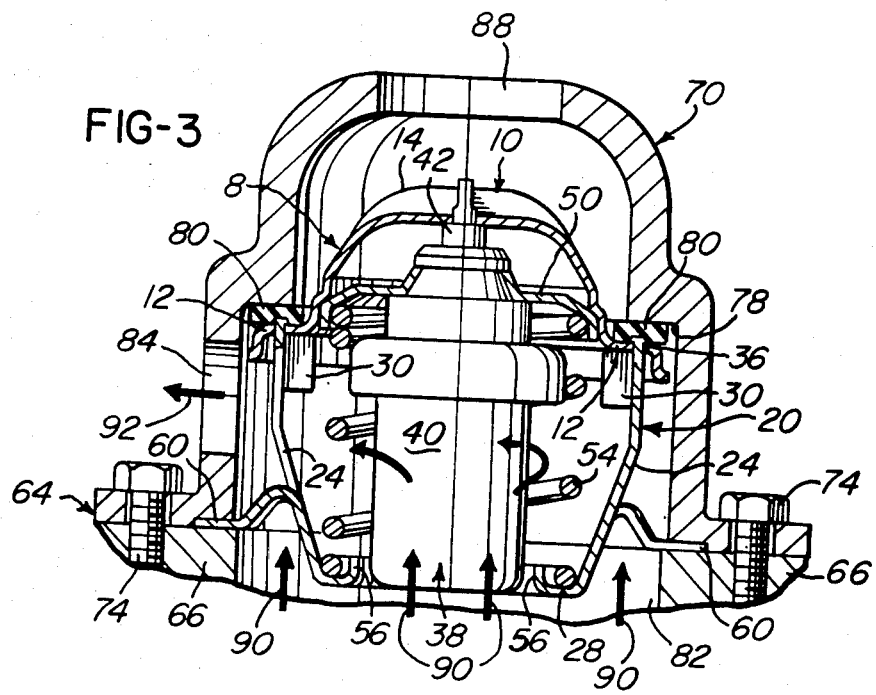

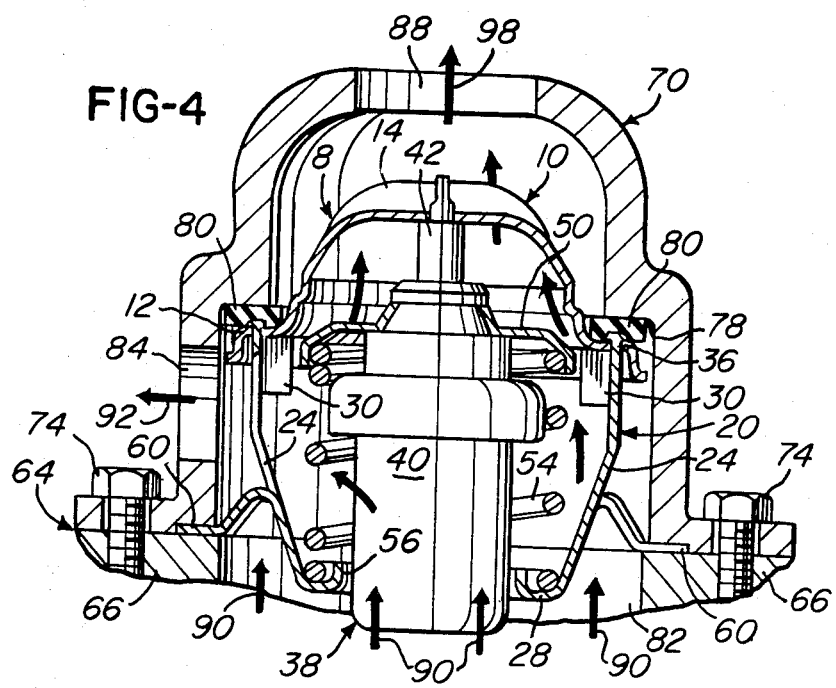

AUTOMOTIVE THERMOSTATIC FLUID CONTROL VALVE DEVICE

RELATED APPLICATION

This application is a continuation of application Ser. No. 513,803, filed July 14, 1983, now abandoned, which is a continuation of U.S. application Ser. No. 318,321, filed Nov. 5, 1981, now abandoned.

BACKGROUND OF THE INVENTION

The cooling systems of many automotive engines are of the by-pass type, in which coolant fluid which flows to the valve device from an upstream conduit is directed to flow in either or both of two downstream conduits. In such a system, coolant fluid is constantly circulating during operation of the engine, and a thermally responsive valve device controls flow of the fluid to the downstream conduits.

It is an object of this invention to provide a thermostatic fluid control valve which is adapted to be mounted within a by-pass type coolant system of an automotive engine.

It is another object of this invention to provide such a thermostatic fluid control valve which can be constructed at relatively low costs.

Other objects and advantages of this invention reside in the construction of parts, the combination thereof, the method of production, and the mode of operation, as will become more apparent from the following description.

SUMMARY OF THE INVENTION

A thermostatic fluid control valve device of this invention comprises a two piece frame structure which is preferably constructed of sheet metal material. One of the frame members includes an annular stationary valve seat portion forming a fluid port therethrough, with an integral bridge extending over the fluid port. The second frame member includes a ring portion and a plurality of leg portions and a plurality of foot portions, all integral. A movable closure member is engageable with the valve seat portion of the first frame member to close the fluid port. A thermally responsive actuator member is operably joined to the closure member for movement thereof. The frame structure is adapted to be firmly positioned between two engagement surfaces within a fluid conduit within which the thermostatic valve device is mounted.

BRIEF DESCRIPTION OF THE VIEWS OF THE DRAWINGS

FIG. 1 is a perspective view, with parts broken away and shown in section, of a thermostatic valve device of this invention.

FIG. 2 is an exploded perspective view of the thermostatic valve device of FIG. 1.

FIG. 3 is a sectional view, drawn on a larger scale than FIGS. 1 and 2, showing the thermostatic valve device of FIGS. 1 and 2 mounted within a portion of a conduit of a cooling system of an automotive engine. This view shows the closure member of the thermostatic valve device in one position of operation.

FIG. 4 is a sectional view, similar to FIG. 3, but showing the closure member of the thermostatic valve device in another position of operation.

DETAILED DESCRIPTION OF THE INVENTION

A thermostatic fluid control valve device 8 of this invention, as shown in the drawings, includes an upper frame member 10, which is preferably basically of sheet metal material, and includes an annular valve seat portion 12, which forms a flow passage therethrough and an integral bridge portion 14 which extends over the flow passage.

A lower frame member 20 is also preferably of sheet metal material and has a pair of spaced-apart leg portions 24, integrally joined at the lower parts thereof by a ring portion 28. The upper parts of the leg portions 24 are shown as having lateraly extending wings 30. The upper ends of the leg portions 24 extend through openings 36 in the annular valve seat portion 12 of the upper frame member 10 and are bent over or attached in any suitable manner to the annular valve seat portion 12 to secure the lower frame member 20 to the upper frame member 10. The wings 30 of the leg portions 24 engage the lower surface of the annular valve seat portion 12 of the upper frame member 10. Thus, the lower frame member 20 is rigidly attached to the upper frame member 10.

Substantially confined within the upper frame member 10 and the lower frame member 20 is a thermally responsive actuator device 38. The thermally responsive actuator device 38 includes a rigid container 40, provided with thermally responsive expansive material therein, such as wax or the like, and an actuator rod 42. The thermally responsive actuator device 38 is preferably of the type disclosed in U.S. Pat. Nos. 2,806,375 and 2,806,376. However, other types of actuator devices may also be satisfactory.

The lower portion of the rigid container 40 is encompassed by the ring portion 28 of the lower frame member 20. The upper portion of the rigid container 40 is attached to a closure member 50. The closure member 50 is preferably of sheet metal material. A coil spring 54 encompasses the container 40 and is compressed between the closure member 50 and the ring portion 28. The ring portion 28 has an upstanding flange 56 which is encompassed by the lower part of the spring 54. Thus, the coil spring 54 urges the closure member 50 toward the annular valve seat portion 12 of the upper frame member 10, and the closure member 50 is normally in engagement with the annular valve seat portion 12. The actuator rod 42 is in engagement with the bridge portion 14 of the upper frame member 10. Integral with the leg portions 24 and the ring portion 28 of the lower frame member 20 are extensions or foot portions 60. The foot portions 60 are angular with respect to the leg portions 24.

The thermostatic valve device 8 of this invention is adapted to be positioned within a conduit of a cooling system of an automotive engine. FIGS. 3 and 4 show a conduit structure 64 provided with a fixed portion 66 with which the foot portions or extensions 60 of the lower frame member 20 are in engagement. A removable conduit member 70 substantially encloses the thermally responsive fluid control valve device 8. The removable conduit member 70 is secured to the fixed portion 66 by means of bolts or cap screws 74. The removable conduit member 70 has an annular internal surface 78 which is engaged by an elastomeric sealing ring 80. The elastomeric sealing ring 80 also engages the upper surface of the annular valve seat portion 12 of the upper frame member 10 and may be attached thereto, as illustrated in FIG. 1. Thus, the thermostatic fluid control valve device 8 is firmly positioned within the conduit structure 64.

The fixed portion 66 of the conduit structure 64 has an opening 82 therein within which the lower part of the lower frame member 20 is positioned. The removable conduit member 70 has an opening 84 and an opening 88 therein, which are adapted to be in communication with downstream conduit portions of the conduit structure 64 and cooling system.

As illustrated in FIG. 3, during operation of the engine with which the thermally responsive fluid control valve device 8 of this invention is associated, fluid flows upwardly through the opening 82, as illustrated by arrows 90, and normally all of the fluid flows outwardly through the opening 84, as illustrated by an arrow 92. However, when the temperature of the fluid which engages the thermally responsive actuator device 38 reaches a given predetermined magnitude, the thermally responsive actuator device 38 operates and the closure member 50 is moved downwardly to open the fluid flow passage through the annular valve seat portion 12 of the upper frame member 10. When this occurs, some of the fluid flows upwardly through the opening 88, as illustrated by an arrow 98 in FIG. 4.

Therefore, it is to be understood that a thermostatic fluid control valve device 8 of this invention serves as a by-pass fluid control valve device, firmly positioned between two internal surfaces of a fluid conduit structure or system and operable to control flow of fluid from an upstream conduit to two downstream conduits.

FIG. 2 shows that the lower frame member 20 is a single piece of sheet metal material which is cut and formed in the manner illustrated. FIGS. 3 and 4 show that the upper frame member 10 is a single piece of sheet metal material formed in the manner illustrated. It is to be understood, however, that either the upper frame member 10 or the lower frame member 20 may consist of a plurality of pieces which are joined together in any suitable manner. It is therefore to be understood that the thermostatic fluid control valve device 8 of this invention may be produced at relatively low costs and may be easily and readily installed within a by-pass cooling system of an automotive engine.

Although the preferred embodiment of the automotive thermostatic fluid control valve device of this invention has been described, it will be understood that within the purview of this invention various changes may be made in the form, details, proportion and arrangement of parts, the combination thereof, and the mode of operation, which generally stated consist in an automotive thermostatic fluid control valve device within the scope of the appended claims.

The invention having thus been described, the following is claimed:

1. In a thermostatic fluid control valve device adapted for use in the cooling system of an automotive engine in which the cooling system has a first engagement surface and an axially spaced generally parallel second engagement surface, the device comprising a first single-piece sheet metal frame member, the first frame member including an annular valve seat portion defining a fluid port and a bridge portion extending over the fluid port, a second single-piece sheet metal frame member, the second frame member including a plurality of leg portions integrally connected by a ring portion, means for joining the leg portions of the second frame member to the annular valve seat portion of the first frame member, a thermally responsive actuator member having a portion encompassed by the ring portion of the second frame member and a portion in engagement with the bridge portion of the first frame member, a closure member attached to the thermally responsive actuator member and movable with respect to the valve seat portion to close and to open the fluid port, and the thermostatic valve device being adapted to be positioned between the first and second engagement surfaces of the cooling system with the seat portion adjacent the first engagement surface, the improvement wherein the second single-piece sheet metal frame member includes a plurality of foot portions integrally connected by the ring portion, the foot portions being part of the second single-piece sheet metal frame member and projecting outwardly from the ring portion for engaging the second engagement surface, the foot portions being circumferentially offset on the ring portion with respect to the leg portions, and each of the foot portions being disposed between two of the leg portions.

2. A thermally responsive fluid control valve device for a fluid conduit system provided with a first engagement surface and an axially spaced generally parallel second engagement surface, the fluid control device being of the type provided with a first frame member, the first frame member including an annular valve seat portion forming a fluid port and a bridge portion integral with the annular valve seat portion and extending across the fluid port, the annular valve seat portion being adapted to engage the first engagement surface of the fluid conduit system, a closure member engageable with the annular valve seat portion of the first frame member to close the fluid port, a thermally responsive actuator member having a portion engaging the closure member and a portion engaging the bridge portion of the first frame member, a coil spring encompassing a portion of the thermally responsive actuator member, the improvement comprising: a second frame member consisting of a single piece of sheet metal material including a ring portion and a plurality of leg portions integral with the ring portion and extending from the ring portion, a plurality of foot portions integral with the ring portion and the leg portions, the foot portions being circumferentially offset on the ring portion, each of the foot portions being positioned between two of the leg portions, the leg portions of the second frame member being attached to the annular valve seat portion of the first frame member to form a frame unit adapted to be positioned within a fluid conduit system with the foot portions extending outwardly from the ring portion and being adapted to engage the second engagement surface of the fluid conduit system, the coil spring engaging the closure member and the ring portion of the second frame member and urging the closure member toward the valve seat portion of the first frame member.

3. The thermally responsive fluid control valve device of claim 2 in which there is one foot portion for each of the leg portions.

4. The thermally responsive fluid control valve device of claim 2 in which each foot portion extends angularly with respect to the leg portions for engagement with the second engagement surface.

* * * * *